(12) United States Patent
Li et al.

(10) Patent No.: US 12,491,277 B2
(45) Date of Patent: Dec. 9, 2025

(54) MULTIFUNCTIONAL MOBILE DIGITAL RADIOGRAPHY DEVICE

(71) Applicant: Shenzhen Browiner Tech Co., Ltd, Shenzhen (CN)

(72) Inventors: Xiaolei Li, Shenzhen (CN); Anshan Wang, Shenzhen (CN); Shufeng Li, Shenzhen (CN)

(73) Assignee: Shenzhen Browiner Tech Co., Ltd, Shenzhen (CN)

( * ) Notice: Subject to any disclaimer, the term of this patent is extended or adjusted under 35 U.S.C. 154(b) by 572 days.

(21) Appl. No.: 17/987,197

(22) Filed: Nov. 15, 2022

(65) Prior Publication Data

US 2023/0277703 A1 Sep. 7, 2023

(30) Foreign Application Priority Data

Mar. 5, 2022 (CN) .......................... 202210211126.8

(51) Int. Cl.
*A61L 2/18* (2006.01)
*A61L 2/10* (2006.01)

(52) U.S. Cl.
CPC ...... *A61L 2/18* (2013.01); *A61L 2/10* (2013.01); *A61L 2202/17* (2013.01)

(58) Field of Classification Search
CPC ........ A61L 2/10; A61B 6/4405; A61B 6/4423
See application file for complete search history.

(56) References Cited

U.S. PATENT DOCUMENTS

2014/0212374 A1* 7/2014 Kim ..................... C07D 233/58
548/335.1
2021/0316020 A1* 10/2021 Stankus ................... A61L 2/10
(Continued)

FOREIGN PATENT DOCUMENTS

CN 101493426 A 7/2009
CN 112641414 A 4/2021
(Continued)

OTHER PUBLICATIONS

Machine Translation of "Yi", CN 101493426 A, cited in the IDS filed Feb. 9, 2023 (Year: 2009).*

(Continued)

*Primary Examiner* — Jennifer Wecker
*Assistant Examiner* — Brady C Pilsbury
(74) *Attorney, Agent, or Firm* — Westbridge IP LLC

(57) ABSTRACT

Disclosed is a multifunctional mobile digital radiography (DR) device. The multifunctional mobile DR device includes a rack, an X-ray detector, an image processor, a display, a handrail provided on the rack and a cleaning mechanism. The cleaning mechanism includes a guide assembly, a moving collar assembly and a first ultraviolet sterilization assembly. The guide assembly is adjacent to the handrail and extends from one end of the handrail to the other end of the handrail. The moving collar assembly is provided on the guide assembly and sleeved outside the handrail. The first ultraviolet sterilization assembly is provided on the moving collar assembly and configured to emit ultraviolet light and irradiate a peripheral of the handrail. The guide assembly is configured to guide the moving collar assembly and the moving collar assembly is configured to reciprocate between two ends of the handrail.

9 Claims, 6 Drawing Sheets

(56) References Cited

U.S. PATENT DOCUMENTS

| | | | | |
|---|---|---|---|---|
| 2023/0212877 A1* | 7/2023 | Horvath | ................... | E05B 1/00 15/4 |
| 2024/0299604 A1* | 9/2024 | Ward | ...................... | E04F 11/18 |

FOREIGN PATENT DOCUMENTS

| | | | | | |
|---|---|---|---|---|---|
| CN | 112656624 | A | 4/2021 | | |
| CN | 213642283 | U | 7/2021 | | |
| CN | 214074013 | U | 8/2021 | | |
| CN | 114103764 | A | 3/2022 | | |
| KR | 1020150046696 | A | 4/2015 | | |
| WO | 2013183924 | A1 | 12/2013 | | |
| WO | WO-2018213884 | A1 * | 11/2018 | ............... | A61L 2/18 |
| WO | 2019237001 | A1 | 12/2019 | | |
| WO | 2021255543 | A1 | 12/2021 | | |

OTHER PUBLICATIONS

First Office Action issued in counterpart Chinese Patent Application No. 202210211126.8, dated Apr. 19, 2022.
European Search Report issued in counterpart European Patent Application No. EP 22206101.2, dated Jul. 7, 2023.

* cited by examiner

MULTIFUNCTIONAL MOBILE DIGITAL RADIOGRAPHY DEVICE

CROSS-REFERENCE TO RELATED APPLICATIONS

This application claims priority to the Chinese Patent Application No. 202210211126.8, filed on Mar. 5, 2022, the entire contents of which are incorporated herein by reference.

TECHNICAL FIELD

The present disclosure relates to the technical field of medical equipment, in particular to a multifunctional mobile digital radiography (DR) device.

BACKGROUND

A digital radiography (DR) device is a device that uses the penetration principle of X-ray to digitally photograph objects, which is usually applied in radio-diagnosis, and widely used in the medical field because of its high-quality images and efficient work efficiency.

At present, the DR device mainly includes a rack, an X-ray detector, an image processor, a display, and other components. The X-ray detector, the image processor and the display are provided on the rack. The image processor is respectively connected to the X-ray detector and the display. The X-ray detector is to convert the X-ray information into electrical signal, convert X-ray analog signal into digital signal and send the digital signal to the image processor for image processing, such as grayscale transformation, black and white reversion, image filtering and denoising, magnification, size measurement, digital subtraction and others. The image processor then sends the signal to the display to reproduce the image for easy reading. Some DR devices are usually designed to be movable for convenience in use.

The inventor found that, since the DR devices usually need to be exposed to the medical environment in the long-term use process, the parts of the equipment in contact with the human body are easily contaminated by bacteria or viruses, which may not well meet the hygienic requirements. Thus, it is necessary to improve the self-purification capacity of the DR device.

SUMMARY

The present disclosure provides a multifunctional mobile digital radiography (DR) device, which aims to improve the self-purification capacity of the DR device.

The multifunctional mobile DR device includes a rack, an X-ray detector, an image processor, a display, a handrail provided on the rack and a cleaning mechanism. The cleaning mechanism includes a guide assembly, a moving collar assembly and a first ultraviolet sterilization assembly. The guide assembly is adjacent to the handrail and extends from one end of the handrail to the other end of the handrail. The moving collar assembly is provided on the guide assembly and sleeved outside the handrail. The first ultraviolet sterilization assembly is provided on the moving collar assembly and configured to emit ultraviolet light and irradiate a peripheral of the handrail. A disinfection gap is formed between the handrail and the moving collar assembly. The guide assembly is configured to guide the moving collar assembly and the moving collar assembly is configured to reciprocate between two ends of the handrail.

The above technical solutions are adopted. The handrail is the most contacted part on the mobile DR device and is easily polluted. By setting the mobile collar assembly, the first ultraviolet sterilization assembly may be driven to move under the guiding action of the guide assembly. Then ultraviolet rays are emitted to cover the handrails in all directions and may efficiently sterilize the handrail. Thus, the self-purification capacity of the DR device is improved to meet the needs of hygienic use.

In some embodiments, the guide assembly includes a guide rod and a screw rod. Two ends of the guide rod are respectively fixedly connected to the rack, two ends of the screw rod are respectively fixedly connected to the rack. The handrail, the guide rod and the screw rod are parallel to each other. Both the guide rod and the screw rod pass through the moving collar assembly, the moving collar assembly is slidably connected to the guide rod, and the screw rod is meshed with the moving collar assembly.

The above technical solutions are adopted. The screw rod may play the role of pushing and supporting the moving collar assembly, such that the moving collar assembly may obtain power from the screw rod. The guide rod is combined with the screw rod to form a guide plane to guide the moving collar assembly. Therefore, the moving collar assembly may reciprocate along a straight line, and the structure of the guide assembly is much reasonable and stable with high moving accuracy.

In some embodiments, the moving collar assembly includes a collar body and a driving component. The collar body is connected to the guide assembly and sleeved outside the handrail, and the first ultraviolet sterilization assembly is fixedly provided on the collar body. The driving component is provided on the collar body and connected to the guide assembly, and the driving component is configured to drive the collar body to reciprocate on the guide assembly.

The above technical solutions are adopted. The collar body may support the first ultraviolet sterilization assembly to fixedly install the first ultraviolet sterilization assembly. Meanwhile, the driving component is provided on the collar body, such that the moving collar assembly itself may generate a driving force. Thus, the structure is more compact and reasonable.

In some embodiments, the driving component includes a driving motor, two bevel gears and a rotating sleeve. An inner side of the rotating sleeve is provided with threads. The driving motor is fixedly installed on the collar body. The two bevel gears are respectively fixedly installed on an output shaft of the driving motor and on the rotating sleeve. The rotating sleeve is rotatably provided on the collar body and is meshed with the guide assembly through the threads. The two bevel gears are meshed with each other.

The above technical solutions are adopted. When the driving motor is activated, the driving motor may drive the bevel gears to rotate. With a pair of bevel gears meshed with each other to transmit the torque to the rotating sleeve, the rotating sleeve rotates. The rotating sleeve gets thrust from the guide assembly under the action of the threads. Further, the collar body may be pushed to move and the structure is ingenious and compact.

In some embodiments, the multifunctional mobile DR device further includes a washing mechanism, a drying mechanism and a spray channel provided inside the moving collar assembly. The spray channel is opened on a side of the moving collar assembly towards the handrail. The washing mechanism is provided on the rack and communicated with the spray channel and the washing mechanism is provided with cleaning liquid inside for spraying the cleaning liquid onto the handrail through the spray channel. The drying mechanism is provided on the rack and communicated with the spray channel and flowing air is formed inside the drying mechanism for spraying the flowing air onto the handrail through the spray channel.

The above technical solutions are adopted. After the handrail is sterilized, the handrail may also be cleaned. The washing mechanism may be activated to spray the cleaning liquid onto the handrail, and then the drying mechanism may be activated to spray the flowing air onto the handrail for drying, which may make the handrail dry, tidy and more hygienic. Meanwhile, the washing mechanism and the drying mechanism share the same spray channel, which may make the structure of the moving collar assembly more compact and ingenious. In addition, the flowing air may dry the residual cleaning liquid to reduce the undesirable phenomenon of continuous dripping of cleaning liquid after use.

In some embodiments, the moving collar assembly is provided with one-way valves, and the one-way valves are respectively located at a first position where the washing mechanism is connected to the spray channel and at a second position where the drying mechanism is connected to the spray channel.

The above technical solutions are adopted. The one-way valves may prevent the cleaning liquid and the flowing air from entering into other mechanisms during spraying and make the cleaning and drying actions independent of each other, which may reduce the interference to other mechanism and improve the cleaning and drying effect.

In some embodiments, the rack is provided with a plane accessory case, and an inner wall of the plane accessory case is provided with a second ultraviolet sterilization assembly.

The above technical solutions are adopted. The plane accessory case is usually used to arrange stationery or document, such that the plane accessory case is easily contaminated because of the accumulated objects. The second ultraviolet sterilization assembly may sterilize the objects in the plane accessory case, which may further improve the self-purification capacity of the DR device.

In some embodiments, the multifunctional mobile DR device further includes a first environmental sterilization device. The first environmental sterilization device includes a rotating mechanism and a third ultraviolet sterilization assembly. The rotating mechanism is provided at a top of the rack, the third ultraviolet sterilization assembly is provided on the rotating mechanism, and the rotating mechanism is configured to drive the third ultraviolet sterilization assembly to rotate.

The above technical solutions are adopted. When the DR device is in idle, the rotating mechanism of the first environmental sterilization device may be activated to drive the third ultraviolet sterilization assembly to rotate, and meanwhile, the third ultraviolet sterilization assembly may emit ultraviolet rays to the surrounding air to kill virus in the surrounding environment, which may further improve the self-purification capacity of the device.

In some embodiments, the multifunctional mobile DR device further includes a second environmental sterilization device. The second environmental sterilization device includes a fourth ultraviolet sterilization assembly and a protective shield. The fourth ultraviolet sterilization assembly and the protective shield are fixedly provided at a bottom of the rack. The fourth ultraviolet sterilization assembly is covered by the protective shield.

The above technical solutions are adopted. The fourth ultraviolet sterilization assembly may disinfect the floor and the protective shield may protect the fourth ultraviolet sterilization assembly. Meanwhile, the structure of the protective shield is clever enough to allow the emission of the ultraviolet rays, which may further improve the self-purification capacity of the device.

In some embodiments, a sterilization material layer is sleeved on the handrail, and the sterilization material layer extends from one end of the handrail to the other end of the handrail.

The above technical solutions are adopted. The sterilization material layer may sterilize and reduce the residual of the bacteria and virus, which may further improve the self-purification capacity of the device.

In conclusion, the present disclosure includes at least one of the following beneficial technical effects:

1. The handrail is the most contacted part on the mobile DR device and is easily polluted. By setting the mobile collar assembly, the first ultraviolet sterilization assembly may be driven to move under the guiding action of the guide assembly. Then, ultraviolet rays may be emitted to cover the handrails in all directions to efficiently sterilize the handrail. The self-purification capacity of the DR device is improved to meet the needs of hygienic use.

2. After the handrail is sterilized by the ultraviolet rays, the washing mechanism may be activated to spray the cleaning liquid onto the handrail, and then the drying mechanism may be activated to spray the flowing air onto the handrail for drying, which may make the handrail dry, tidy and more hygienic. Meanwhile, the washing mechanism and the drying mechanism share the same spray channel. Thus, the flowing air may dry the residual cleaning liquid to reduce the accumulation of cleaning liquid in the spray channel.

3. The device may sterilize the surrounding space and floor by being provided with the second sterilization assembly, the first environmental sterilization device and the second environmental sterilization device, which make the device have an excellent purification capacity.

The realization of the objective, functional characteristics, and advantages of the present disclosure are further described with reference to the accompanying drawings.

DETAILED DESCRIPTION OF THE EMBODIMENTS

The present disclosure will be further described in detail below with reference to FIG. 1 to FIG. 8.

The present disclosure provides a multifunctional mobile digital radiography (DR) device.

Figure 1:
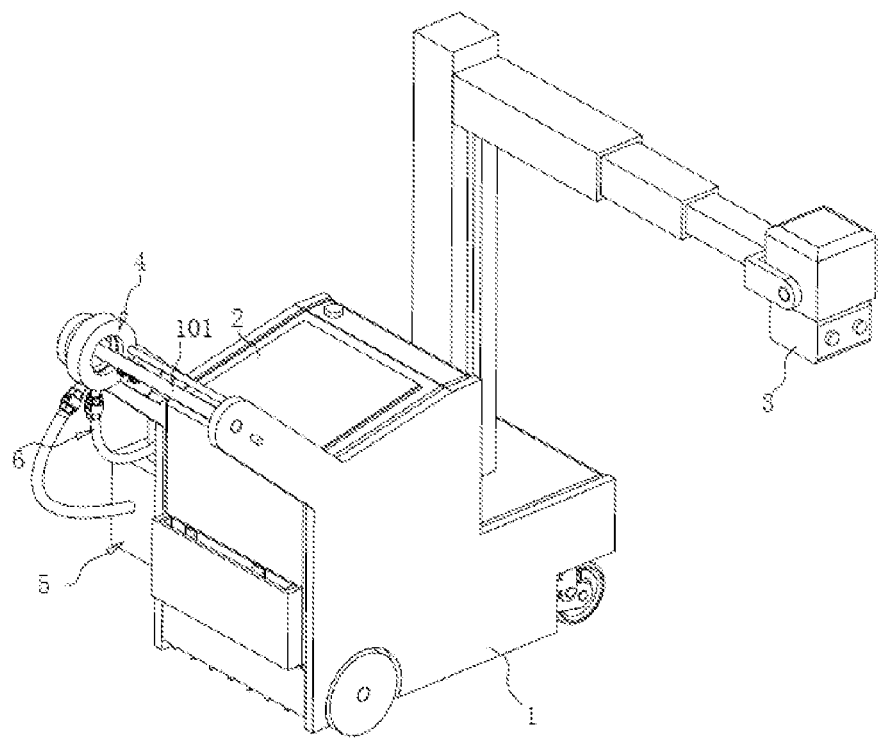
FIG. 1 is a schematic structural view of a mobile digital radiography (DR) device according to some embodiments of the present disclosure.

As shown in FIG. 1, the device includes a rack 1, an X-ray detector 3 provided on the rack 1, an image processor and a display 2. The image processor is respectively in communication link with the X-ray detector 3 and the display 2. And the specific functions of the X-ray detector 3, the image processor and the display 2 will not be repeated here.

The handrail 101 is fixedly installed on the rack 1, and the user pushes the device to move by holding the handrail 101. Therefore, the handrail 101 is the most contacted part on the mobile DR device. Thus, the handrail 101 needs to be cleaned to meet the hygiene requirements of the device.

Figure 2:
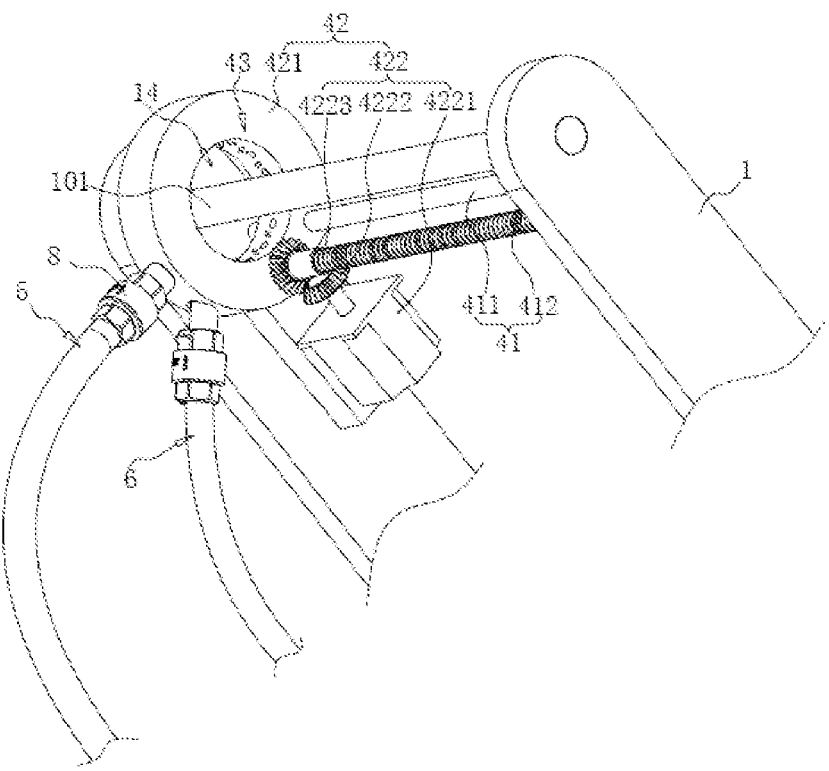
FIG. 2 is a schematic structural view of a cleaning mechanism according to some embodiments of the present disclosure.

As shown in FIG. 1 and FIG. 2, in order to improve the self-purification capability of the device, the device is provided with the cleaning mechanism 4 to solve the aforementioned problem.

The cleaning mechanism 4 includes a guide assembly 41, a moving collar assembly 42 and a first ultraviolet sterilization assembly 43. The guide assembly 41 is provided on the rack 1 and adjacent to the handrail 101. The moving collar assembly 42 is provided on the guide assembly 41 and sleeved outside the handrail 101. The guide assembly 41 is configured to guide the moving collar assembly 42 and the moving collar assembly 42 is configured to reciprocate between two ends of the handrail 101. Meanwhile, the first ultraviolet sterilization assembly 43 is provided on the moving collar assembly 42 and configured to emit ultraviolet light and irradiate a peripheral of the handrail 101. In this way, the all-round disinfection of the handrail 101 is achieved.

As shown in FIG. 2, in order to guide the moving collar assembly 42, the guide assembly 41 includes a guide rod 411 and a screw rod 412.

Two ends of the guide rod 411 are respectively fixedly connected to the rack 1, and two ends of the screw rod 412 are respectively fixedly connected to the rack 1. The handrail 101, the guide rod 411 and the screw rod 412 are adjacent and parallel to each other. Meanwhile, the handrail 101, the guide rod 411 and the screw rod 412 have the same length. The guide assembly 41 extends from one end of the handrail 101 to the other end of the handrail 101.

The moving collar assembly 42 is slidably connected to the guide rod 411, and the screw rod 412 is meshed with the moving collar assembly 42. The guide rod 411 guides the moving collar assembly 42 to slide, such that the moving collar assembly 42 may freely reciprocate along the length direction of the handrail 101. Meanwhile, the screw rod 412 may provide a force point for the moving collar assembly 42 to output power and finally the movement is realized.

In order to make the moving collar assembly 42 reciprocate on the guide assembly 41, the moving collar assembly 42 includes a collar body 421. The collar body 421 is in a quasi-circular shape. The collar body 421 is provided with a sliding hole, and the guide rod 411 penetrates the collar body 421 through the sliding hole. The guide rod 411 is slidably connected to the collar body 421, the moving collar assembly 42 may be slidably connected to the guide rod 411. Meanwhile, the collar body 421 is sleeved outside the handrail 101, and a disinfection gap 14 is formed between the collar body 421 and the handrail 101.

In addition, the moving collar assembly 42 further includes a driving component 422 which may output power. The driving component 422 is provided on the collar body 421 and connected to the screw rod 412 of the guide assembly 41.

The driving component 422 includes a driving motor 4221, two bevel gears 4222 and a rotating sleeve 4223. The rotating sleeve 4223 is configured in the shape of a circular tube, and the collar body 421 is provided with a mounting hole. The rotating sleeve 4223 is rotatably installed in the mounting hole of the collar body 421 through a bearing. Meanwhile, the inner side of the rotating sleeve 4223 is provided with threads. The screw rod 412 penetrates through the rotating sleeve 4223 and is meshed with the rotating sleeve 4223 through threads. Thus, the screw rod 412 and the moving collar assembly 42 are meshed with each other. If the rotating sleeve 4223 rotates, the collar body 421 may be driven to reciprocate on the guide assembly 41.

Further, the driving motor 4221 is fixedly installed on the collar body 421, the driving motor 4221 is provided adjacent to the rotating sleeve 4223, and the output shaft of the driving motor 4221 extends toward the direction where the rotating sleeve 4223 is located. The bevel gears 4222 are provided two in number, two bevel gears 4222 are fixedly installed on the output shaft of the driving motor 4221 and on the rotating sleeve 4223 respectively, and the two bevel gears 4222 are meshed with each other.

When the driving motor 4221 is activated, the driving motor 4221 may drive the bevel gears 4222 to rotate, and a pair of mutually meshed bevel gears 4222 transmit the torque to the rotating sleeve 4223, such that the rotating sleeve 4223 rotates. With the effect of the threads, the rotating sleeve 4223 may obtain a thrust from the screw rod 412, and then the collar body 421 may be pushed to reciprocate. The first ultraviolet sterilization assembly 43 is fixedly provided on the collar body 421, and the collar body 421 drives the first ultraviolet sterilization assembly 43 to irradiate ultraviolet rays on the whole handrail 101.

In some embodiments, the first ultraviolet sterilization assembly 43 includes several ultraviolet lamps. The several ultraviolet lamps are fixedly installed on the inner side of the collar body 421 and are evenly distributed along the circumferential direction of the collar body 421. The ultraviolet lamps are opposite to the handrail 101, and the several ultraviolet lamps may irradiate the peripheral side of the handrail 101 after turning on the power supply, so as to realize sterilization and disinfection of the handrail 101. Further, by activating the driving component 422, the collar body 421 may be pushed to reciprocate on the guide assembly 41, thereby sterilizing and disinfecting the whole handrail 101.

Figure 4:
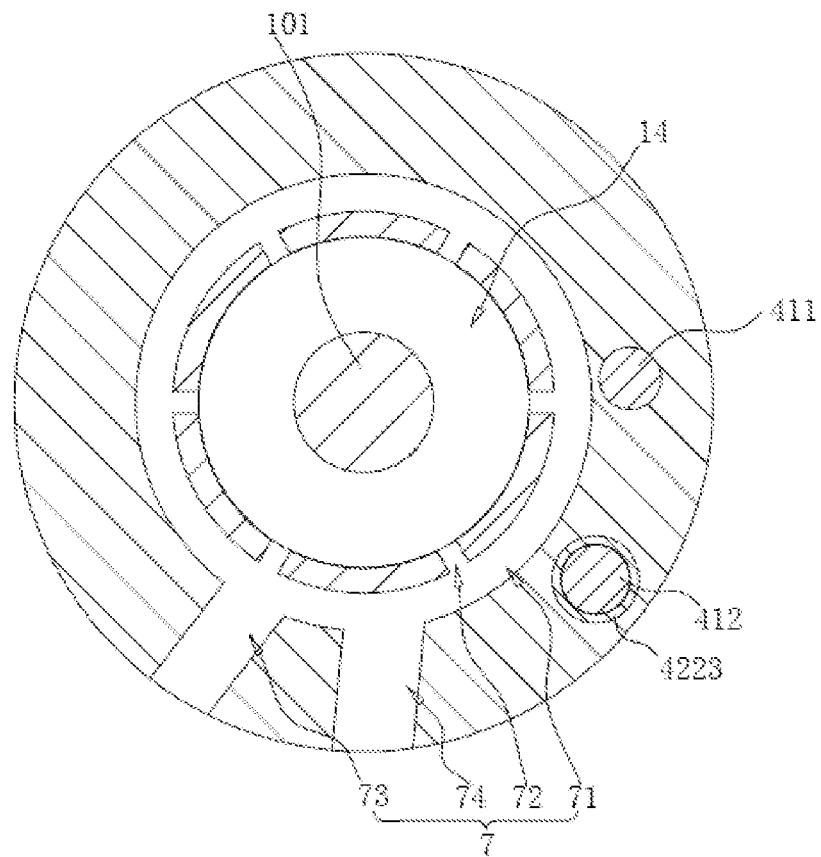
FIG. 4 is a schematic cross-sectional view of a collar body according to some embodiments of the present disclosure.

As shown in FIG. 4, in order to further improve the cleaning effect, the device also includes a washing mechanism 5 and a drying mechanism 6. The moving collar assembly 42 is provided with a spray channel 7 inside. Specifically, the spray channel 7 is provided on the collar body 421. The spray channel 7 includes an annular main section 71, and the main section 71 extends along the circumferential direction of the collar body 421. The spray channel 7 also includes a plurality of spraying sections 72 extending from the main section 71 toward the disinfection gap 14. The spraying sections 72 is opened toward the inner side of the collar body 421 so that the spray channel 7 can be opened on a side of the moving collar assembly 42 towards the handrail 101.

The plurality of spraying sections 72 are evenly distributed along the circumferential direction of main section 71.

The spraying sections 72 may be provided six, twelve or eighteen in number. The number of the spraying sections 72 may be adjusted according to actual needs, which is not limited herein.

In addition, the spray channel 7 further includes a first entry section 73 and a second entry section 74 extending toward the outer side of the collar body 421. Both the first entry section 73 and the second entry section 74 are opened at the outer periphery of the collar body 421.

The washing mechanism 5 is provided on the rack 1 and communicated with the spray channel 7 through the first entry section 73. Specifically, the washing mechanism 5 includes a container 51, a pump body 52 and a liquid hose 53. The container 51 is fixedly installed on the rack 1 and the container 51 may contain the cleaning liquid, such as alcohol or water. The pump body 52 is fixedly installed on the container 51 and is communicated with the container 51, and the two ends of the liquid hose 53 are respectively connected to the pump body 52 and the collar body 421. Besides the liquid hose 53 is communicated with the first entry section 73. When the pump body 52 is activated, the pump body 52 may pump the cleaning liquid in the container 51 to the first entry section 73 through the liquid hose 53, and divide the flow to several spraying sections 72 through the main section 71. Thereby the cleaning liquid flows from the spraying sections 72 are sprayed onto the handrail 101 to clean the handrail 101.

Meanwhile, the drying mechanism 6 is provided on the rack 1 and communicated with the spray channel 7 through the second entry section 74. Specifically, the drying mechanism 6 includes an air heater 61 and a gas hose 62, and the air heater 61 is fixedly installed on the rack 1. The two ends of the gas hose 62 are respectively fixedly connected to the outlet of the air heater 61 and the collar body 421, and the gas hose 62 is communicated with the second entry section 74. Thus, hot air formed by the air heater 61 in the drying mechanism 6 may enter the second entry section 74 through the gas hose 62, and may be branched to several spraying sections 72 through the main section 71. The flowing air sprayed from the spraying sections 72 onto the handrail 101 is used to dry the cleaning liquid.

After the handrail 101 is sterilized, the washing mechanism 5 cleans the handrail 101, and the drying mechanism 6 sprays the flowing air onto the handrail 101 for drying, so that the handrail 101 may become dry, tidy, and more hygienic. Meanwhile, the washing mechanism 5 and the drying mechanism 6 share the same spray channel 7. In this way, on one hand, the structure of moving collar assembly 42 may be more compact, and on the other hand, the spraying flowing air may dry the cleaning liquid remaining in the spray channel 7 to reduce the accumulation of the cleaning liquid in the spray channel 7.

Figure 3:
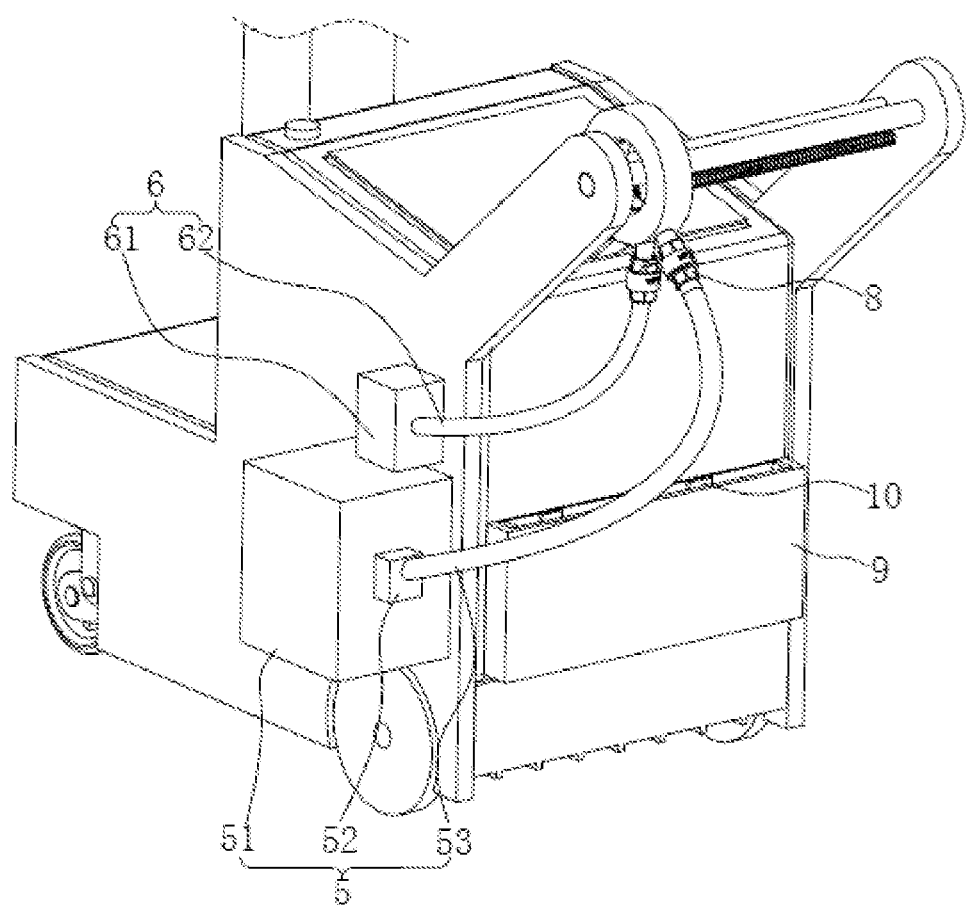
FIG. 3 is a schematic structural view of a washing mechanism and a drying mechanism according to some embodiments of the present disclosure.

As shown in FIG. 3, in order to reduce the mutual interference between the washing mechanism 5 and the drying mechanism 6, several one-way valves 8 are respectively provided on the moving collar assembly 42. More specifically, the number of the one-way valves 8 is two, the two one-way valves are fixedly installed on the collar body 421, and the two one-way valves 8 are respectively communicated with the first entry section 73 and the second entry section 74 of the spray channel 7. The liquid hose 53 and the gas hose 62 are respectively fixedly connected to the two one-way valves 8. And the two one-way valves 8 are respectively located at a first position where the washing mechanism 5 is connected to the spray channel 7 and at a second position where the drying mechanism 6 is connected to the spray channel 7. Such that the one-way valves 8 may prevent the backflow of the medium, which make the actions of washing and drying independent of each other, thereby reducing the interference of mechanical components.

Figure 5:
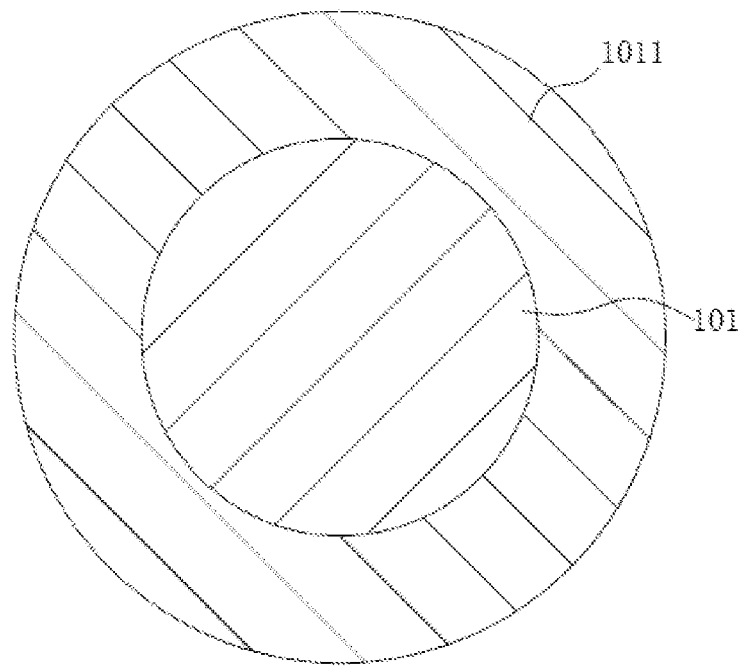
FIG. 5 is a schematic cross-sectional view of a handrail according to some embodiments of the present disclosure.

Further, as shown in FIG. 5, the handrail 101 may improve the self-purification capability by being provided with a corresponding sterilization structure. A sterilization material layer 1011 is sleeved on the handrail 101, and the sterilization material layer 1011 may be made of antibacterial plastic with silver ions, or may be a layer of coating containing silver ions additives on metal. The silver ion additives may kill viruses and bacteria attached to the surface of the handrail 101 through silver ions. Meanwhile, the sterilization material layer 1011 extends from one end of the handrail 101 to the other end of the handrail 101, in order to fully cover the handrail 101. Since the sterilization material layer 1011 may sterilize to reduce the residual of bacteria or viruses on the handrail 101, the self-purification capability of the device is further improved.

As shown in FIG. 3, a plane accessory case 9 is fixedly installed on the rack 1. The plane accessory case 9 is usually used for placing stationery or documents. During the process of picking up and placing documents, the documents will be exposed to the medical environment, thereby causing bacteria or viruses accumulating in the plane accessory case 9. In order to overcome the above-mentioned problems, a second ultraviolet sterilization assembly 10 is provided on the inner wall of the plane accessory case 9 and the second ultraviolet sterilization assembly 10 includes several ultraviolet lamps. The several ultraviolet lamps are evenly distributed on the inner wall of the plane accessory case 9. When the second ultraviolet sterilization assembly 10 is activated, the items in the plane accessory case 9 may be sterilized by ultraviolet rays emitted, which is conductive to meet the sanitation requirements.

The implementation principle of the multifunctional mobile DR device in some embodiments of the present disclosure is as follows: by activating the driving component 422 on the moving collar assembly 42, the collar body 421 may drive the first ultraviolet sterilization assembly 43 slide along the direction of the handrail 101. During this process, the guide assembly 41 plays a guiding role, and the first ultraviolet sterilization assembly 43 immediately emits ultraviolet rays to cover the handrail 101 in all directions, which may effectively sterilize the handrail 101. Meanwhile, a layer of sterilization material layer 1011 sleeved on the handrail 101 may improve the self-cleaning ability of the handrail 101, and the second ultraviolet sterilization assembly 10 is configured in the plane accessory case 9 to further improve the self-cleaning ability of the device.

Figure 6:
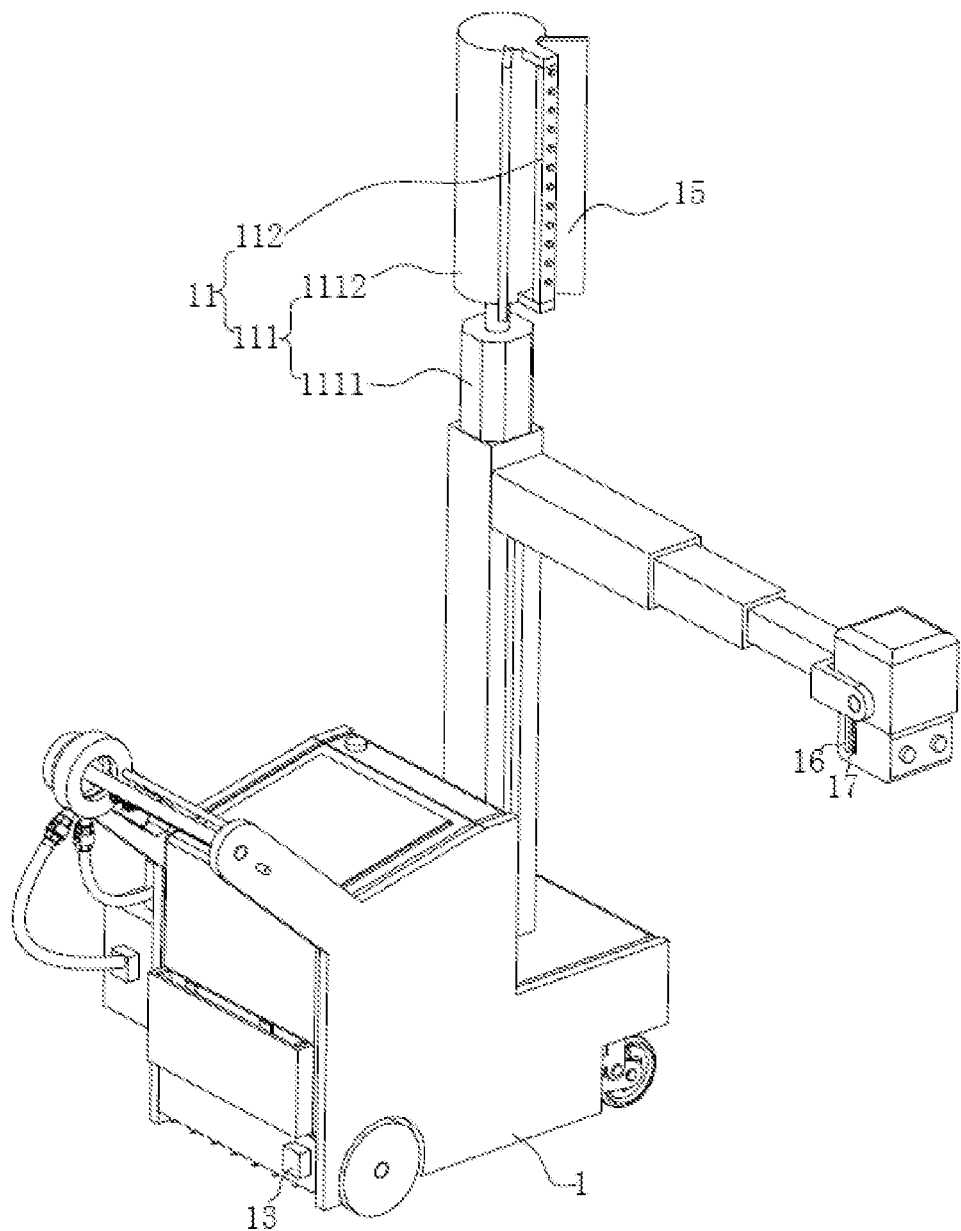
FIG. 6 is a schematic structural view of a mobile DR device according to some embodiments of the present disclosure.
Figure 7:
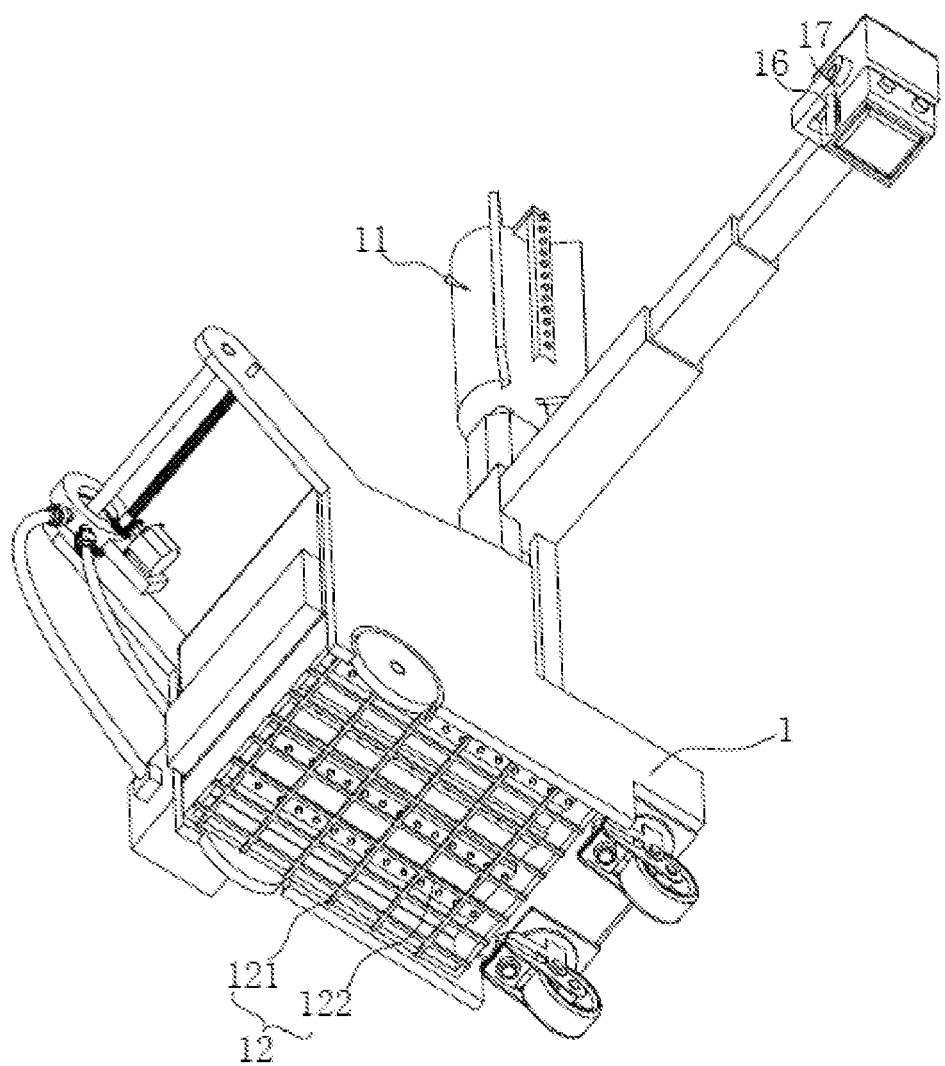
FIG. 7 is a schematic structural view of the mobile DR device from another perspective according to some embodiments of the present disclosure.

In some embodiments, as shown in FIG. 6 and FIG. 7, in order to improve the applicability of the device, the device further includes a first environmental sterilization device 11 provided at the top of the rack 1 and a second environmental sterilization device 12 provided at the bottom of the rack 1.

The first environmental sterilization device 11 includes a rotating mechanism 111 and a third ultraviolet sterilization assembly 112. The rotating mechanism 111 is provided at the top of the rack 1. The rotating mechanism 111 specifically includes a rotating base 1112 and a rotating motor 1111. The rotating motor 1111 is fixedly installed on the rack 1, the output shaft of the rotating motor 1111 is vertically upward, and the rotating base 1112 is fixedly installed on the output shaft of the rotating motor 1111. The rotating motor 1111 may be activated to drive the rotating base 1112 to rotate.

The rotating mechanism 111 is used to drive the second ultraviolet sterilization assembly 10 to rotate. Specifically, the third ultraviolet sterilization assembly 112 is provided on the rotating base 1112 of the rotating mechanism 111, and the third ultraviolet sterilization assembly 112 is selected to include ultraviolet lamps. The third ultraviolet sterilization assembly 112 is fixedly installed on one side of the rotating base 1112, and a condenser 15 is fixedly installed on the rotating base 1112. The third ultraviolet sterilization assembly 112 is adjacent to the condenser, and the condenser 15 faces the third ultraviolet sterilization assembly 112 and the outside of the device.

The ultraviolet light emitted by the third ultraviolet sterilization assembly 112 may be emitted toward the outside of the device through the condenser, thereby sterilizing and disinfecting the external space of the equipment. Such that the functionality of the equipment is improved. In addition, with the rotating motor 1111 being activated, the rotating base 1112 is driven to rotate by the rotating motor 1111, so that the ultraviolet light emitted by the third ultraviolet sterilization assembly 112 is directed toward the periphery of the equipment, which widen the disinfecting area. Meanwhile, the ultraviolet light emitted by the third ultraviolet sterilization assembly 112 may also illuminate the top of the equipment, and then sterilize the top of the equipment.

As shown in FIG. 6 and FIG. 7, in addition, the second environmental sterilization device 12 includes a fourth ultraviolet sterilization assembly 122 and a protective shield 121. The protective shield 121 has several mesh holes, the fourth ultraviolet sterilization assembly 122 and the protective shield 121 are fixedly installed on the bottom of the rack 1, and an accommodating cavity is formed between the protective shield 121 and the rack 1. The fourth ultraviolet sterilization assembly 122 is covered by the protective shield 121 to make the fourth ultraviolet sterilization assembly 122 located in the accommodating cavity.

The fourth ultraviolet sterilization assembly 122 may emit ultraviolet light toward the ground. Thus, the fourth ultraviolet sterilization assembly 122 may sterilize the floor. Meanwhile, the protective shield 121 protects the fourth ultraviolet sterilization assembly 122 to prevent the fourth ultraviolet sterilization assembly 122 from being impacted, and the cleaning capability of the device is further improved.

As shown in FIG. 6 and FIG. 7, the rack 1 is usually configured in a retractable form, and the X-ray detector 3 is configured in the retractable part of the rack 1 for the position adjustment during use. In order to facilitate the position adjustment of the X-ray detector 3, a handle 16 is usually fixedly installed on the rack 1. However, the handle 16 is exposed to the medical environment and is not easy to clean. In order to overcome the above problems, the rack 1 is provided with a fifth ultraviolet sterilizer assembly, the fifth ultraviolet sterilization assembly 17 includes several ultraviolet lamps, and the several ultraviolet lamps are distributed in sequence along the length direction of the handle 16. The ultraviolet lamps are fixedly installed on the rack 1 and adjacent to the handle 16. When the fifth ultraviolet sterilization assembly 17 is activated, the fifth ultraviolet sterilization assembly 17 may emit ultraviolet light and irradiate it onto the handle 16, thereby sterilizing and disinfecting the handle 16, and the equipment is more hygienic and cleaner during use.

Figure 8:
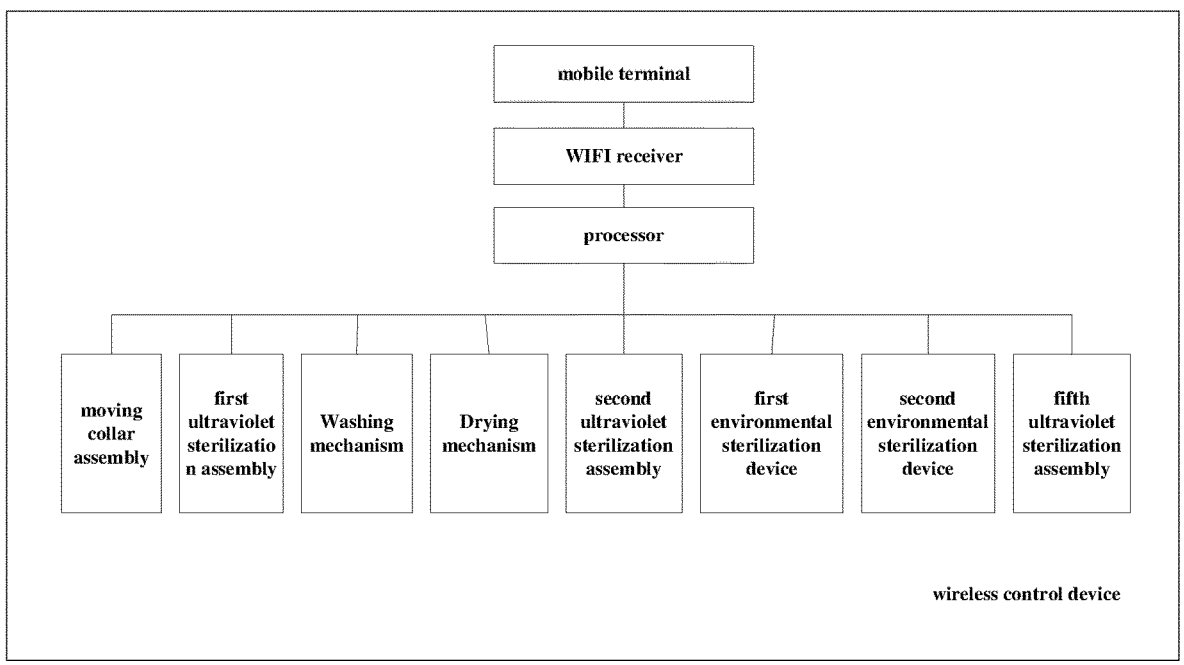
FIG. 8 is a schematic structural view of a wireless control device according to some embodiments of the present disclosure.

As shown in FIG. 8, in order to improve the convenience of use of the device, a wireless control device 13 is also provided on the device. The wireless control system includes a WIFI receiver, a processor and a mobile terminal, and the mobile terminal may be a tablet computer, a mobile phone or a notebook computer or other equipment. The mobile terminal is provided with control software, and the mobile terminal is in communication link with the WIFI receiver to operate the control software. Thus, the mobile terminal may generate a first wireless signal, a second wireless signal, a third wireless signal, a fourth wireless signal, a fifth wireless signal or a sixth wireless signal. The WIFI receiver is connected to the processor, the processor may be selected as a PLC controller, and the processor is respectively electrically connected to the moving collar assembly 42, the first ultraviolet sterilization assembly 43, the washing mechanism 5, the drying mechanism 6, the second ultraviolet sterilization assembly 10, the first environmental sterilization device 11, the second environmental sterilization device 12 and the fifth ultraviolet sterilization assembly 17.

When the mobile terminal is operated to generate the first wireless signal, the output terminal of the mobile terminal sends the first wireless signal to the receiving terminal of the WIFI receiver, the WIFI receiver responds to the first wireless signal and generates the first control signal, and the sending terminal of the WIFI receiver sends the first control signal to the receiving terminal of the processor, the processor then responds to the first control signal and generates a first start-stop signal, and the sending terminal of the processor sends the first start-stop signal to the receiving ends of the moving collar assembly 42 and the first ultraviolet sterilization assembly 43. Thus, the moving collar assembly 42 and the first ultraviolet sterilization assembly 43 may move to sterilize the handrail 101.

When the mobile terminal is operated to generate the second wireless signal, the output terminal of the mobile terminal sends the second wireless signal to the receiving terminal of the WIFI receiver, the WIFI receiver responds to the second wireless signal and generates the second control signal, and the sending terminal of the WIFI receiver sends the second control signal to the receiving terminal of the processor, the processor then responds to the second control signal and generates a second start-stop signal, and the sending terminal of the processor sends the second start-stop signal to the receiving ends of the moving collar assembly 42 and the washing mechanism 5, thereby realizing the mobile cleaning to the handrail 101.

When the mobile terminal is operated to generate the third wireless signal, the output terminal of the mobile terminal sends the third wireless signal to the receiving terminal of the WIFI receiver, the WIFI receiver responds to the third wireless signal and generates the third control signal, and the sending terminal of the WIFI receiver sends the third control signal to the receiving terminal of the processor, the processor then responds to the third control signal and generates a third start-stop signal, and the sending terminal of the processor sends the third start-stop signal to the receiving ends of the moving collar assembly 42 and the drying mechanism 6, thereby drying the handrail 101.

When the mobile terminal is operated to generate the fourth wireless signal, the output terminal of the mobile terminal sends the fourth wireless signal to the receiving terminal of the WIFI receiver, the WIFI receiver responds to the fourth wireless signal and generates the fourth control signal, and the sending terminal of the WIFI receiver sends the fourth control signal to the receiving terminal of the processor, the processor then responds to the fourth control signal and generates a fourth start-stop signal, and the sending terminal of the processor sends the fourth start-stop signal to the receiving end of the second ultraviolet sterilization assembly 10, thereby sterilizing and disinfecting the plane accessory case 9.

When the mobile terminal is operated to generate the fifth wireless signal, the output terminal of the mobile terminal sends the fifth wireless signal to the receiving terminal of the WIFI receiver, the WIFI receiver responds to the fifth wireless signal and generates the fifth control signal, and the sending terminal of the WIFI receiver sends the fifth control signal to the receiving terminal of the processor, the processor then responds to the fifth control signal and generates a fifth start-stop signal, and the sending terminal of the processor sends the fifth start-stop signal to the receiving ends of the first environmental sterilization device 11 and the second environmental sterilization device 12, thereby sterilizing and disinfecting the surrounding environment.

When the mobile terminal is operated to generate the sixth wireless signal, the output terminal of the mobile terminal sends the sixth wireless signal to the receiving terminal of the WIFI receiver, the WIFI receiver responds to the sixth wireless signal and generates the sixth control signal, and the sending terminal of the WIFI receiver sends the sixth control signal to the receiving terminal of the processor, the processor then responds to the sixth control signal and generates a sixth start-stop signal, and the sending terminal of the processor sends the sixth start-stop signal to the receiving end of the fifth ultraviolet sterilization assembly 17, thereby sterilizing and disinfecting the handle 16.

Through the above configurations, the mobile terminal may control the device wirelessly, and the convenience of using the device is improved.

In some implements, the implementation principle of a multifunctional mobile DR device is as follows. Since a third ultraviolet sterilization assembly 112 is provided on the top of the rack 1 and a fourth ultraviolet sterilization assembly 122 is provided at the bottom of the rack 1, the device may meet its own cleaning requirements and may sterilize the surrounding environment at the same time. Thus, the applicability of the equipment is improved. Meanwhile, with the wireless control device 13, the moving collar assembly 42, the first ultraviolet sterilization assembly 43, the washing mechanism 5, the drying mechanism 6, the second ultraviolet sterilization assembly 10, the first environmental sterilization device 11 and the second environmental sterilization device 12 may be wirelessly controlled, which may improve the convenience of use.

The above are all preferred embodiments of the present disclosure, and are not intended to limit the protection scope of the present disclosure. Therefore, all equivalent changes made according to the structure, shape and principle of the present disclosure should be covered within the scope of the present disclosure.

What is claimed is:

1. A multifunctional mobile digital radiography (DR) device, comprising:
    a rack;
    an X-ray detector provided on the rack;
    an image processor;
    a display;
    a handrail provided on the rack; and
    a cleaning mechanism comprising:
        a guide assembly adjacent to the handrail and extending from one end of the handrail to the other end of the handrail;
        a moving collar assembly provided on the guide assembly and sleeved outside the handrail; and
        a first ultraviolet sterilization assembly provided on the moving collar assembly and configured to emit ultraviolet light and irradiate a peripheral of the handrail, wherein a disinfection gap is formed between the handrail and the moving collar assembly, the guide assembly is configured to guide the moving collar assembly, and the moving collar assembly is configured to reciprocate between two ends of the handrail;
    the guide assembly comprises a guide rod and a screw rod;
    two ends of the guide rod are respectively fixedly connected to the rack, and two ends of the screw rod are respectively fixedly connected to the rack;
    the handrail, the guide rod and the screw rod are parallel to each other;
    both the guide rod and the screw rod pass through the moving collar assembly; and
    the moving collar assembly is slidably connected to the guide rod, and the screw rod is meshed with the moving collar assembly.

2. The multifunctional mobile DR device of claim 1, wherein the moving collar assembly comprises:
    a collar body connected to the guide assembly and sleeved outside the handrail, the first ultraviolet sterilization assembly being fixedly provided on the collar body; and
    a driving component provided on the collar body and connected to the guide assembly, the driving component being configured to drive the collar body to reciprocate on the guide assembly.

3. The multifunctional mobile DR device of claim 2, wherein:
    the driving component comprises a driving motor, two bevel gears and a rotating sleeve,
    an inner side of the rotating sleeve is provided with threads,
    the driving motor is fixedly installed on the collar body,
    the two bevel gears are respectively fixedly installed on an output shaft of the driving motor and on the rotating sleeve,
    the rotating sleeve is rotatably provided on the collar body and is meshed with the guide assembly through the threads, and
    the two bevel gears are meshed with each other.

4. The multifunctional mobile DR device of claim 1, further comprising:
    a washing mechanism;
    a drying mechanism; and
    a spray channel provided inside the moving collar assembly, the spray channel being opened on a side of the moving collar assembly towards the handrail,
    wherein:
    the washing mechanism is provided on the rack and communicated with the spray channel, and the washing mechanism is provided with cleaning liquid inside for spraying the cleaning liquid onto the handrail through the spray channel, and
    the drying mechanism is provided on the rack and communicated with the spray channel, and flowing air is formed inside the drying mechanism for spraying the flowing air onto the handrail through the spray channel.

5. The multifunctional mobile DR device of claim 4, wherein the moving collar assembly is provided with one-way valves, and the one-way valves are respectively located at a first position where the washing mechanism is connected to the spray channel and at a second position where the drying mechanism is connected to the spray channel.

6. The multifunctional mobile DR device of claim 1, wherein the rack is provided with a plane accessory case, and an inner wall of the plane accessory case is provided with a second ultraviolet sterilization assembly.

7. The multifunctional mobile DR device of claim 1, further comprising:

a first environmental sterilization device comprising:
a rotating mechanism; and
a third ultraviolet sterilization assembly,
wherein the rotating mechanism is provided at a top of the rack, the third ultraviolet sterilization assembly is provided on the rotating mechanism, and the rotating mechanism is configured to drive the third ultraviolet sterilization assembly to rotate.

8. The multifunctional mobile DR device of claim 1, further comprising:
a second environmental sterilization device comprising
a fourth ultraviolet sterilization assembly; and
a protective shield,
wherein the fourth ultraviolet sterilization assembly and the protective shield are fixedly provided at a bottom of the rack, and the fourth ultraviolet sterilization assembly is covered by the protective shield.

9. The multifunctional mobile DR device of claim 1, wherein a sterilization material layer is sleeved on the handrail, and the sterilization material layer extends from one end of the handrail to the other end of the handrail.

\* \* \* \* \*